H. P. RANKIN.
Chopping-Block for Meat-Cutter.

No. 168,286. Patented Sept. 28, 1875.

WITNESSES:
W. W. Hollingsworth
Colon C. Kernon

INVENTOR:
H. P. Rankin
BY
ATTORNEYS.

UNITED STATES PATENT OFFICE.

HUGH P. RANKIN, OF ALLEGHENY, PENNSYLVANIA.

IMPROVEMENT IN CHOPPING-BLOCKS FOR MEAT-CUTTERS.

Specification forming part of Letters Patent No. 168,286, dated September 28, 1875; application filed January 29, 1875.

*To all whom it may concern:*

Be it known that I, HUGH P. RANKIN, of the city and county of Allegheny, and State of Pennsylvania, have invented a new and Improved Meat-Chopper; and I do hereby declare that the following is a full, clear, and exact description of the same, reference being had to the accompanying drawing, forming a part of this specification, in which—

Figure 1:
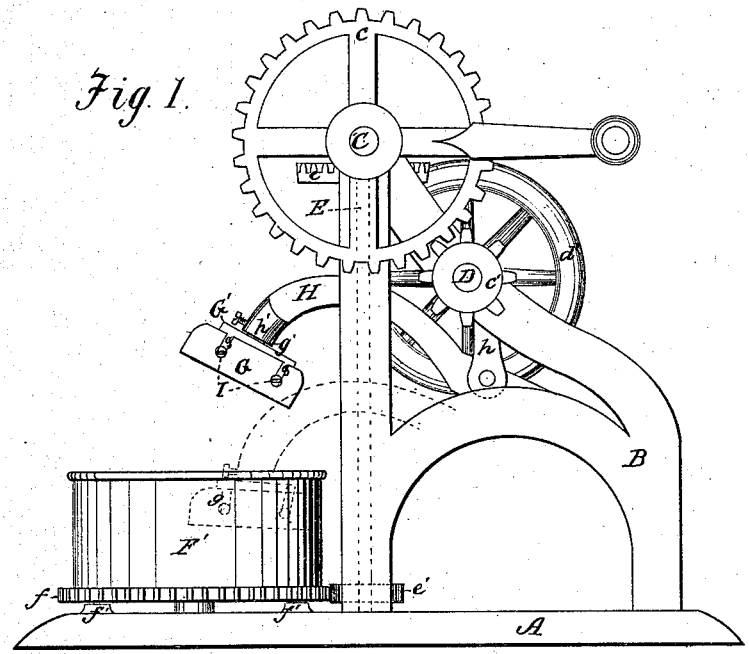
Figure 2:
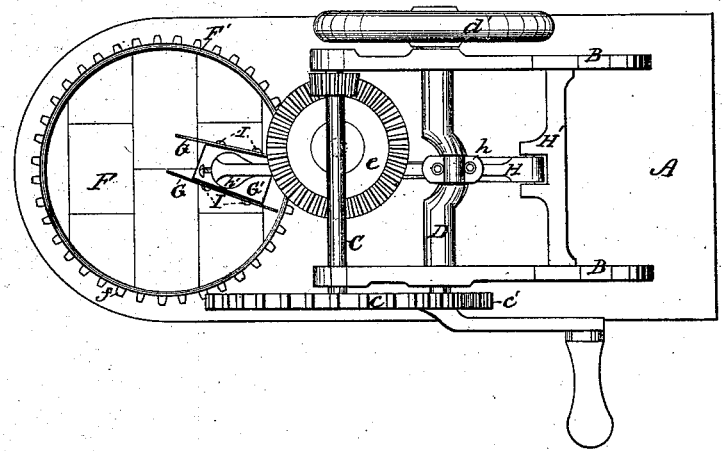

Figure 1 is a side elevation, and Fig. 2 a plan view.

The invention will first be fully described in connection with all that is necessary to a full understanding thereof, and then pointed out in the claim.

A represents the base, on which is erected a frame, B, wherein is secured a hand crank shaft, C, having a spur-wheel, c, and pinion c'. D is a crank-shaft, having the pinion-wheel d, as well as balance d'; and E, a vertical shaft, having crown-wheel e and pinion e'. F is the chopping-block, provided with a spur-wheel rim, f, by which the block that supports the meat may be rotated on friction wheels or props f' while the chopper cuts it up.

Thus far I do not claim that there is any especial novelty; but, in connection with these devices, I have made the following improvements: First, I have constructed the meat-block (which wears unequally) in sections, so that when one or more are rendered uneven by use they may be removed and replaced without destroying the whole block. These I hold firmly together by a broad metallic band, F', that projects sufficiently above the block to prevent the meat from escaping over the edges. Second, instead of attaching the choppers G G to a vertically-movable plunger, or a lever that works above its operating crank-shaft, I connect them by a stock, G', with a third-class lever, H, that is fulcrumed to a rear bar, H', and hung to a crank of shaft D by a pivoted strap, h.

By this construction a stronger machine is obtained, and the ends of the lever take all the strain, instead of throwing it upon caps or pins, in the usual manner, while I am also enabled to secure a good draw-cut to the knives.

Having thus described my invention, what I claim as new is—

The combination, with sectional block, of the band F', passed around and extending above the edge of block, as shown and described, to serve both as a clamp for sections, and guard against the escape of chopped meat.

HUGH P. RANKIN.

Witnesses:
WM. H. STERRITT,
F. A. LOHMEYER.